United States Patent
Shimomura et al.

(10) Patent No.: US 12,457,036 B2
(45) Date of Patent: Oct. 28, 2025

(54) TRANSMISSION DIRECTION DETERMINATION APPARATUS, TRANSMISSION DIRECTION DETERMINATION METHOD, RECORDING MEDIUM, AND TRANSMISSION DIRECTION DETERMINATION MODULE

(71) Applicant: NEC Corporation, Tokyo (JP)

(72) Inventors: Yusuke Shimomura, Tokyo (JP); Hitoshi Takeshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 108 days.

(21) Appl. No.: 18/425,020

(22) Filed: Jan. 29, 2024

(65) Prior Publication Data

US 2024/0275483 A1    Aug. 15, 2024

(30) Foreign Application Priority Data

Feb. 10, 2023 (JP) ................. 2023-019094

(51) Int. Cl.
| | |
|---|---|
| H04B 10/079 | (2013.01) |
| G02B 6/42 | (2006.01) |
| G02B 6/43 | (2006.01) |
| H04B 10/25 | (2013.01) |

(52) U.S. Cl.
CPC ....... *H04B 10/0795* (2013.01); *G02B 6/4214* (2013.01); *G02B 6/43* (2013.01); *H04B 10/25* (2013.01)

(58) Field of Classification Search
CPC .. H04B 10/0795; H04B 10/25; G02B 6/4214; G02B 6/43
See application file for complete search history.

(56) References Cited

U.S. PATENT DOCUMENTS

2020/0336204 A1* 10/2020 Hassan ............... H04J 14/0221

FOREIGN PATENT DOCUMENTS

JP          2014-222310 A    11/2014

* cited by examiner

*Primary Examiner* — Georgia Y Epps
*Assistant Examiner* — Don J Williams
(74) *Attorney, Agent, or Firm* — Sughrue Mion, PLLC

(57) ABSTRACT

A transmission direction determination apparatus includes: a first lens configured to collimate light propagating from one multi-core fiber of two multi-core fibers to the other multi-core fiber of the two multi-core fibers; a second lens configured to focus the light that has propagated from the first lens; a partially reflective mirror configured to reflect part of the collimated light and including a first surface and a second surface; a first photodetector disposed on a side of the first surface of the partially reflective mirror and configured to measure an intensity of signal light reflected by the partially reflective mirror; and a second photodetector disposed on a side of the second surface of the partially reflective mirror and configured to measure an intensity of signal light reflected by the partially reflective mirror.

9 Claims, 15 Drawing Sheets

TRANSMISSION DIRECTION DETERMINATION APPARATUS, TRANSMISSION DIRECTION DETERMINATION METHOD, RECORDING MEDIUM, AND TRANSMISSION DIRECTION DETERMINATION MODULE

CROSS-REFERENCE TO RELATED APPLICATIONS

This application is based upon and claims the benefit of priority from Japanese patent application No. 2023-019094, filed on Feb. 10, 2023, the disclosure of which is incorporated herein in its entirety by reference.

TECHNICAL FIELD

The present disclosure relates to a transmission direction determination apparatus, a transmission direction determination method, a recording medium, and a transmission direction determination module.

BACKGROUND ART

Increasing the transmission capacity of optical fiber transmission is an urgent goal to be attained in order to respond to increased demand for internet communication traffic. However, the transmission capacity of single-core fibers is considered to have an upper limit of 100 Tbit/s due to restrictions on transmission bands, limits on frequency utilization efficiency increase and limits on noise suppression in optical repeaters. Therefore, in recent years, there has been interest in spatial division multiplexing technologies for spatial division multiplexed transmission of transmission signals. Multi-core fibers, which are a spatial division multiplexing technology, have multiple cores in a single fiber, and have been proposed not only for increasing transmission capacity, but also for efficiently accommodating asymmetry of traffic demand by allowing the transmission direction in each core to be variable. In order to change the transmission direction in each core in a multi-core fiber, a technology for determining the transmission direction of signal light propagating inside the cores is indispensable. The use of the aforementioned technology in a multi-core fiber transmission path, or in a single-core fiber transmission path obtained by splitting each core in a multi-core fiber into a single-core fiber by means of a splitting device such as an FI/FO (Fan-in/Fan-out) device can be contemplated.

Japanese Unexamined Patent Application, First Publication No. 2014-222310 discloses a method for determining the presence or absence of signal light in each core constituted by a lens, a partially reflective mirror and a photodetector. This method is technology for detecting defects, etc. by determining the presence or absence of signal light by inserting the partially reflective mirror in the transmission path of a multi-core fiber, reflecting part of the signal light outside the transmission path, and measuring the intensity thereof with the photodetector.

SUMMARY

In optical fiber technology as mentioned above, the technology of being able to detect the transmission direction of light propagating through a core is required.

The present disclosure has the purpose of providing a transmission direction determination apparatus, a transmission direction determination method, a program, and a transmission direction determination module that solve the above-mentioned problem.

According to a first example aspect, a transmission direction determination apparatus includes: a first lens configured to collimate light propagating from one multi-core fiber of two multi-core fibers to the other multi-core fiber of the two multi-core fibers; a second lens configured to focus the light that has propagated from the first lens; a partially reflective mirror configured to reflect part of the collimated light and including a first surface and a second surface; a first photodetector disposed on a side of the first surface of the partially reflective mirror and configured to measure an intensity of signal light reflected by the partially reflective mirror; a second photodetector disposed on a side of the second surface of the partially reflective mirror and configured to measure an intensity of signal light reflected by the partially reflective mirror; a memory configured to store instructions; and a processor configured to execute the instructions to determine a transmission direction of light propagating through respective cores in the two multi-core fiber from the signal intensities measured by the first and second photodetectors.

According to a second example aspect, a transmission direction determination apparatus includes: a first lens that collimates light propagating from one optical fiber bundle including a plurality of optical fibers to another optical fiber bundle including a plurality of optical fibers; a second lens configured to focus the light that has propagated from the first lens; a partially reflective mirror configured to reflect part of the collimated light and including a first surface and a second surface; a first photodetector disposed on a side of the first surface of the partially reflective mirror and configured to measure an intensity of signal light reflected by the partially reflective mirror; a second photodetector disposed on a side of the second surface of the partially reflective mirror and configured to measure an intensity of signal light reflected by the partially reflective mirror; a memory configured to store instructions; and a processor configured to execute the instructions to determine a transmission direction of light propagating through respective cores in the two multi-core fiber from the signal intensities measured by the first and second photodetectors.

According to a third example aspect, a transmission direction determination method includes: collimating, by a first lens, light propagating from one multi-core fiber of two multi-core fibers to the other multi-core fiber of the two multi-core fibers; focusing, by a second lens, the light that has propagated from the first lens; reflecting, by a partially reflective mirror, part of the collimated light; measuring, by a first photodetector disposed on a side of a first surface of the partially reflective mirror, an intensity of signal light reflected by the partially reflective mirror; measuring, by a second photodetector disposed on a side of a second surface of the partially reflective mirror, an intensity of signal light reflected by the partially reflective mirror; and determining, by a processor, a transmission direction of light propagating through respective cores in the two multi-core fiber from the signal intensities measured by the first and second photodetectors.

According to a fourth example aspect, a non-transitory computer readable recording medium that stores a program for a computer. The computer includes: a first lens configured to collimate light propagating from one multi-core fiber of two multi-core fibers to the other multi-core fiber of the two multi-core fibers; a second lens configured to focus the light that has propagated from the first lens; a partially reflective mirror configured to reflect part of the collimated light and including a first surface and a second surface; a first photodetector disposed on a side of the first surface of the partially reflective mirror and configured to measure an intensity of signal light reflected by the partially reflective mirror; and a second photodetector disposed on a side of the second surface of the partially reflective mirror and configured to measure an intensity of signal light reflected by the partially reflective mirror. The program causes the computer to execute: determining a transmission direction of light propagating through respective cores in the two multi-core fiber from the signal intensities measured by the first and second photodetectors.

According to a fifth example aspect, a transmission direction determination module includes: a first lens configured to collimate light propagating from one multi-core fiber of two multi-core fibers to the other multi-core fiber of the two multi-core fibers; a second lens configured to focus the light that has propagated from the first lens; a partially reflective mirror configured to reflect part of the collimated light and including a first surface and a second surface; a first photodetector disposed on a side of the first surface of the partially reflective mirror and configured to measure an intensity of signal light reflected by the partially reflective mirror; and a second photodetector disposed on a side of the second surface of the partially reflective mirror and configured to measure an intensity of signal light reflected by the partially reflective mirror.

According to the present disclosure, the transmission directions of light being transmitted in a multi-core fiber can be determined.

EXAMPLE EMBODIMENT

First Example Embodiment (Explanation of Structure)

Figure 1:
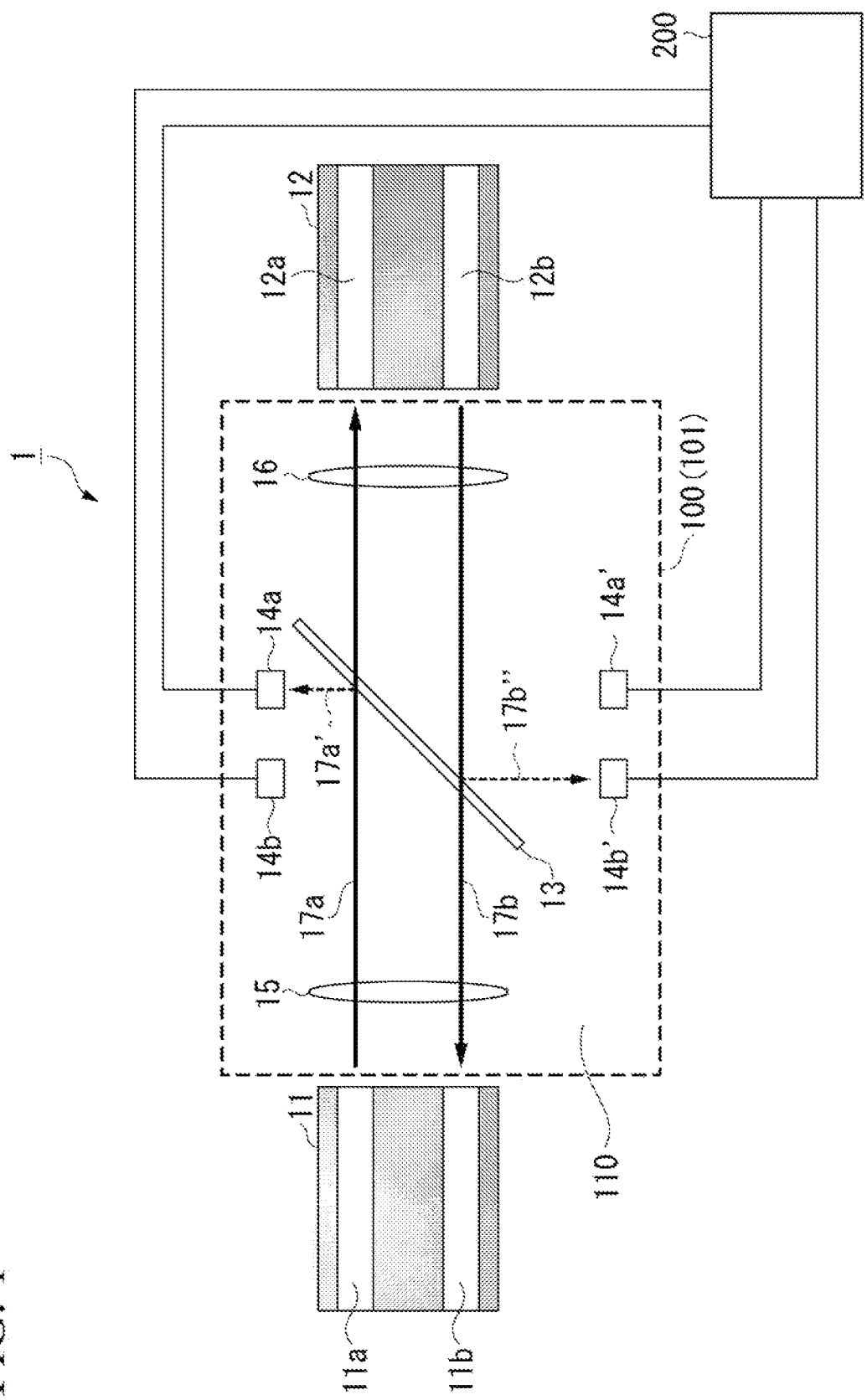
FIG. 1 is a first schematic diagram of a transmission direction determination apparatus according to a first example embodiment of the present disclosure.

FIG. 1 is a first schematic diagram of a transmission direction determination apparatus according to a first example embodiment of the present disclosure.

Figure 2:
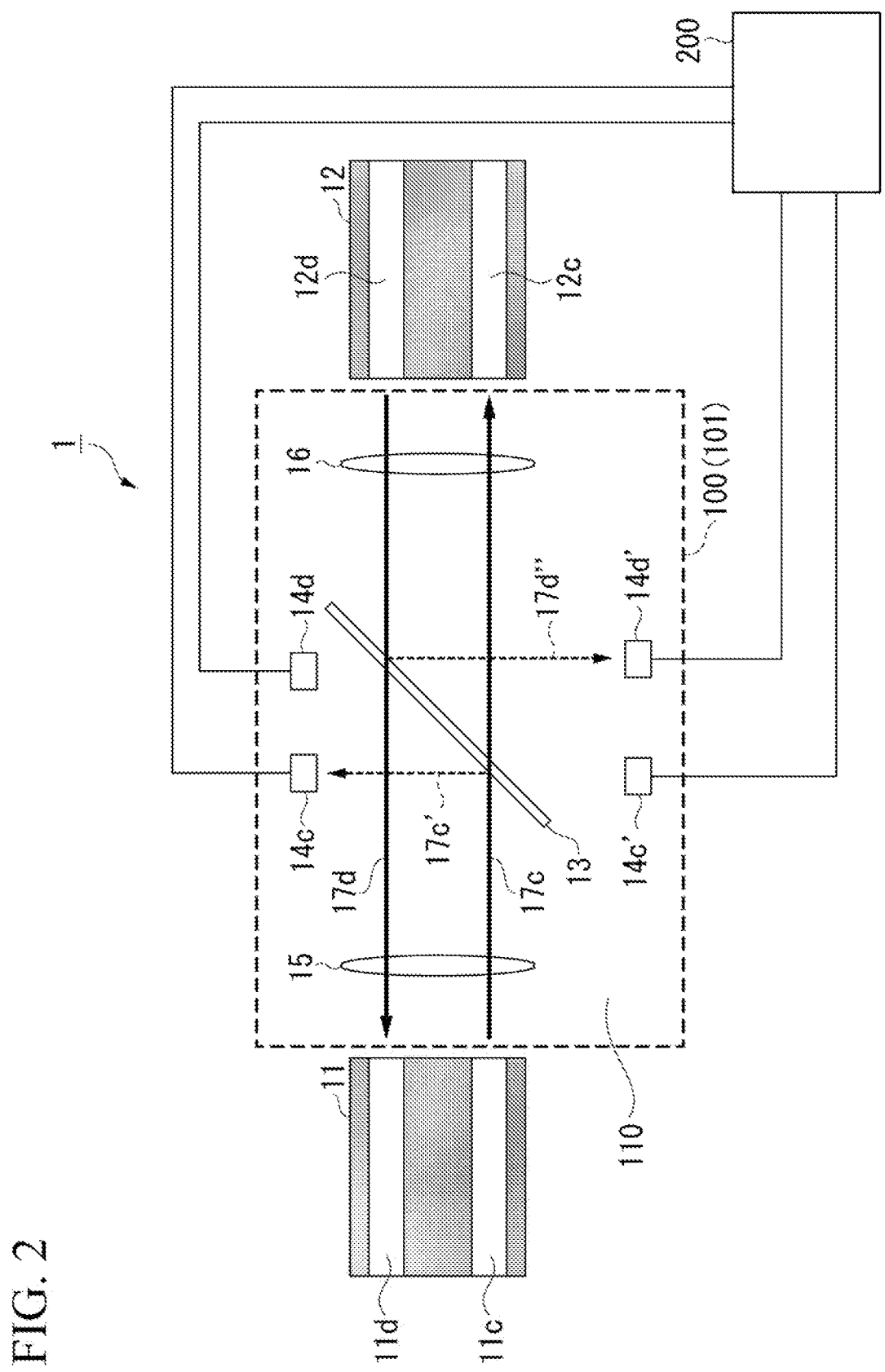
FIG. 2 is a second schematic diagram of the transmission direction determination apparatus according to the first example embodiment of the present disclosure.

FIG. 2 is a second schematic diagram of the transmission direction determination apparatus according to the first example embodiment of the present disclosure.

The transmission direction determination apparatus 1 is constituted by a multi-core fiber 11, a multi-core fiber 12, an optics unit 100 (transmission direction determination module 101) and a transmission direction determination unit 200. The optics unit 100 constituting the transmission direction determination module 101 has a hollow portion 110 through which signal light 17a-17d propagating through respective cores 11a-11d of the multi-core fiber 11 or respective cores 12a-12d of the multi-core fiber 12 propagates to the other multi-core fiber. The hollow portion 110 is provided with a lens 15, a lens 16, a mirror 13, and a photodetector 14.

The lens 15 and the lens 16 collimate the light emitted from one multi-core fiber of the multi-core fiber 11 and the multi-core fiber 12, and focus the collimated light on the respective cores of the other multi-core fiber. That is, the lens 15 and the lens 16 are each provided with a first lens function for collimating the light that is output from each of the multiple cores in one multi-core fiber of two mutually opposing multi-core fibers and that propagates to the other multi-core fiber. Additionally, the lens 15 and the lens 16 are each, when the other lens is the first lens, provided with a second lens function for collimating the light that has propagated from the first lens and focusing the light output from each of the multiple cores of the one multi-core fiber on a corresponding core of the other multi-core fiber.

The mirror 13 is a partially reflective mirror having the property of reflecting part of the signal light 17a-17d. The mirror 13 has at least two reflective surfaces, front and rear, that respectively reflect prescribed percentages of the collimated light output from the one multi-core fiber and from the other multi-core fiber of the multi-core fiber 11 and the multi-core fiber 12. The mirror 13 transmits the collimated light, except for the prescribed percentage, in the direction of the other multi-core fiber. More specifically, the mirror 13 passes light in the wavelength region of the signal light included in the light propagating from the one multi-core fiber to the other multi-core fiber of the multi-core fiber 11 and the multi-core fiber 12, and reflects, at the front and rear reflective surfaces, a prescribed percentage of light in the wavelength region of the signal light, the percentage being small in comparison with the light that is transmitted.

The photodetector 14 is constituted by photodetectors 14a-14d and photodetectors 14a'-14d'. The photodetectors 14a, 14a' detect the intensity of light propagating from the core 11a to the core 12a, or from the core 12a to the core 11a. Similarly, the respective photodetectors 14 that are identified by lower-case letters detect the intensities of the signal light propagating from the cores of the one multi-core fiber identified by the same lower-case letters to the cores of the other multi-core fiber. In FIG. 1, for convenience of explanation, two pairs of photodetectors 14a, 14a' and photodetectors 14b, 14b' are illustrated. In FIG. 2, for convenience of explanation, two pairs of photodetectors, i.e., photodetectors 14c, 14c' and photodetectors 14d, 14d' are illustrated. In fact, these photodetectors 14a-14d and photodetectors 14a'-14d' are all included in the optics unit 100.

The transmission direction determination unit 200 is connected with each of the photodetectors 14a-14d and the photodetectors 14a'-14d', and has the function of determining the transmission direction of the signal light propagating through each of the cores by comparing the optical intensities at the respective photodetectors. Though not described in FIG. 1, the transmission direction determination unit 200 may have a signal cable for transmitting transmission direction determination results to the outside connected thereto.

In the present disclosure, the explanation will be made by using multi-core fibers 11, 12 having four cores as examples of the multi-core fibers. However, in other example embodiments, the respective multi-core fibers may have multiple cores of a number other than four. In that case, the optics unit 100 is provided with n pairs of photodetectors, where n is the number of cores in the multi-core fibers.

Figure 3A:
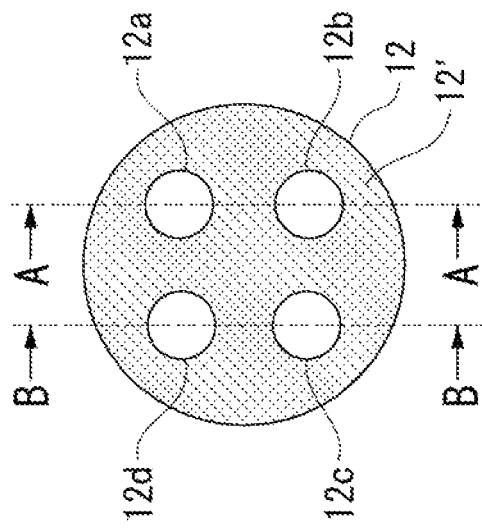
FIG. 3A is a schematic section view of a multi-core fiber according to the present example embodiment.
Figure 3B:
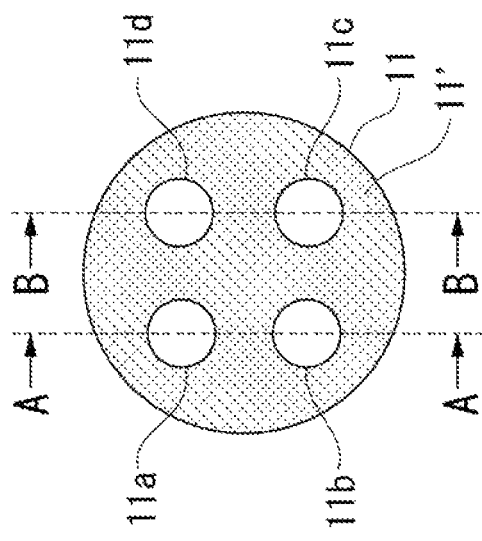
FIG. 3B is a schematic section view of a multi-core fiber according to the present example embodiment.

FIGS. 3A and 3B are schematic section views of multi-core fibers according to the present example embodiment.

As illustrated in FIGS. 3A and 3B, the multi-core fibers 11, 12 include four cores 11a-11d and 12a-12d inside claddings 11', 12'. The multi-core fibers 11, 12 have not restrictions on the number of cores when actually used. However, the multi-core fibers 11, 12 each preferably have the same number of cores.

The light propagating through the multi-core fibers 11, 12 will be referred to as signal light, and the light propagating through the cores 11a-11d and 12a-12d will be referred to, respectively, as the signal light 17a-17d. Although the signal light propagating through each of the cores can propagate in either direction, in the explanation in the present disclosure, the explanation below will be made under the assumption that the signal light 17a propagates from the core 11a to the core 12a, the signal light 17b propagates from the core 12b to the core 11b, the signal light 17c propagates from the core 11c to the core 12c, and the signal light 17d propagates from the core 12d to the core 11d, as illustrated in FIG. 1 and FIG. 2.

The lens 15 is provided between the multi-core fiber 11 and the mirror 13, collimates the light emitted from the cores 11a-11d of the multi-core fiber 11, and focuses the signal light that has passed through the mirror 13 and that is transmitted in the direction of the multi-core fiber 11 to the respective cores 11a-11d of the multi-core fiber 11.

The lens 16 is installed between the multi-core fiber 12 and the mirror 13, collimates the light emitted from the cores 12a-12d of the multi-core fiber 12, and focuses the signal light that has passed through the mirror 13 and been transmitted in the direction of the multi-core fiber 12 on the cores 12a-12d of the multi-core fiber 12.

The mirror 13 has the property of reflecting part (a prescribed percentage) of the signal light 17a-17d and passing most of the signal light 17a-17d. The signal light reflected at the reflective surface of the mirror 13 on the side of the multi-core fiber 11 will be referred to as reflected light 17a'-17d', and the signal light reflected at the reflective surface of the mirror 13 on the side of the multi-core fiber 12 will be referred to as reflected light 17a"-17d". The mirror 13 is oriented at a certain angle for emitting the reflected light 17a'-17d' and 17a"-17d" outside the transmission path of the optical signals being transmitted between the multi-core fibers. The photodetectors 14a-14d and the photodetectors 14a'-14d' are respectively arranged based on the angle of the mirror 13.

The photodetectors 14a-14d are installed at locations at which they can detect the reflected light 17a'-17d' obtained by the signal light 17a-17d being reflected at the reflective surface of the mirror 13 on the side of the multi-core fiber 11. Additionally, it is preferable to provide the same number of photodetectors 14a-14d as the number of cores in the multi-core fibers used for transmission.

The photodetectors 14a'-14d' are installed at locations at which they can detect the reflected light 17a"-17d" obtained by the signal light 17a-17d being reflected at the reflective surface of the mirror 13 on the side of the multi-core fiber 12. Additionally, it is preferable to provide the same number of photodetectors 14a'-14d' as the number of cores in the multi-core fibers used for transmission.

FIG. 1 illustrates the case in which a prescribed percentage of the signal light propagating from the core 11a in the multi-core fiber 11 to the core 12a in the multi-core fiber 12 through the hollow portion 110 of the optics unit 100 has been reflected at one reflective surface of the mirror 13 and detected by the photodetector 14a. Additionally, FIG. 1 illustrates the case in which a prescribed percentage of the signal light propagating from the core 12b in the multi-core fiber 12 to the core 11b in the multi-core fiber 11 through the hollow portion 110 of the optics unit 100 has been reflected at the other reflective surface of the mirror 13 and detected by the photodetector 14b'.

FIG. 2 illustrates the case in which a prescribed percentage of the signal light propagating from the core 12d in the multi-core fiber 12 to the core 11d in the multi-core fiber 11 through the hollow portion 110 of the optics unit 100 has been reflected at the one reflective surface of the mirror 13 and detected by the photodetector 14d'. Additionally, FIG. 2 illustrates the case in which a prescribed percentage of the signal light propagating from the core 11c in the multi-core fiber 11 to the core 12c in the multi-core fiber 12 through the hollow portion 110 of the optics unit 100 has been reflected at the other reflective surface of the mirror 13 and detected by the photodetector 14c. The respective photodetectors 14 output the intensities of the detected light to the transmission direction determination unit 200.

Hereinafter, in order to simplify the explanation in the present example embodiment, the explanation will be performed by using FIG. 1, which is a schematic diagram focusing on the cores 11a, 11b, 12a, 12b in the cross-section, at the line A-A, of the multi-core fibers 11, 12 illustrated in FIGS. 3A and 3B, and FIG. 2, which is a schematic diagram focusing on the cores 11c, 11d, 12c, 12d in the cross-section at the line B-B.

First, the method for determining the transmission direction of signal light propagating through each core will be explained by using FIG. 1. As illustrated in FIG. 1, the signal light 17a propagates from the core 11a to 12a and a part of the light is reflected by the reflective surface of the mirror 13 on the side of the multi-core fiber 11, thereby generating reflected light 17a'. The photodetector 14a determines the optical intensity of the reflected light 17a'.

Meanwhile, since the signal light does not propagate from the core 12a to 11a, no light (i.e., reflected light 17a") is reflected at the reflective surface of the mirror 13 on the side of the multi-core fiber 12. Therefore, almost no optical intensity is detected by the photodetector 14a'.

Figure 4:
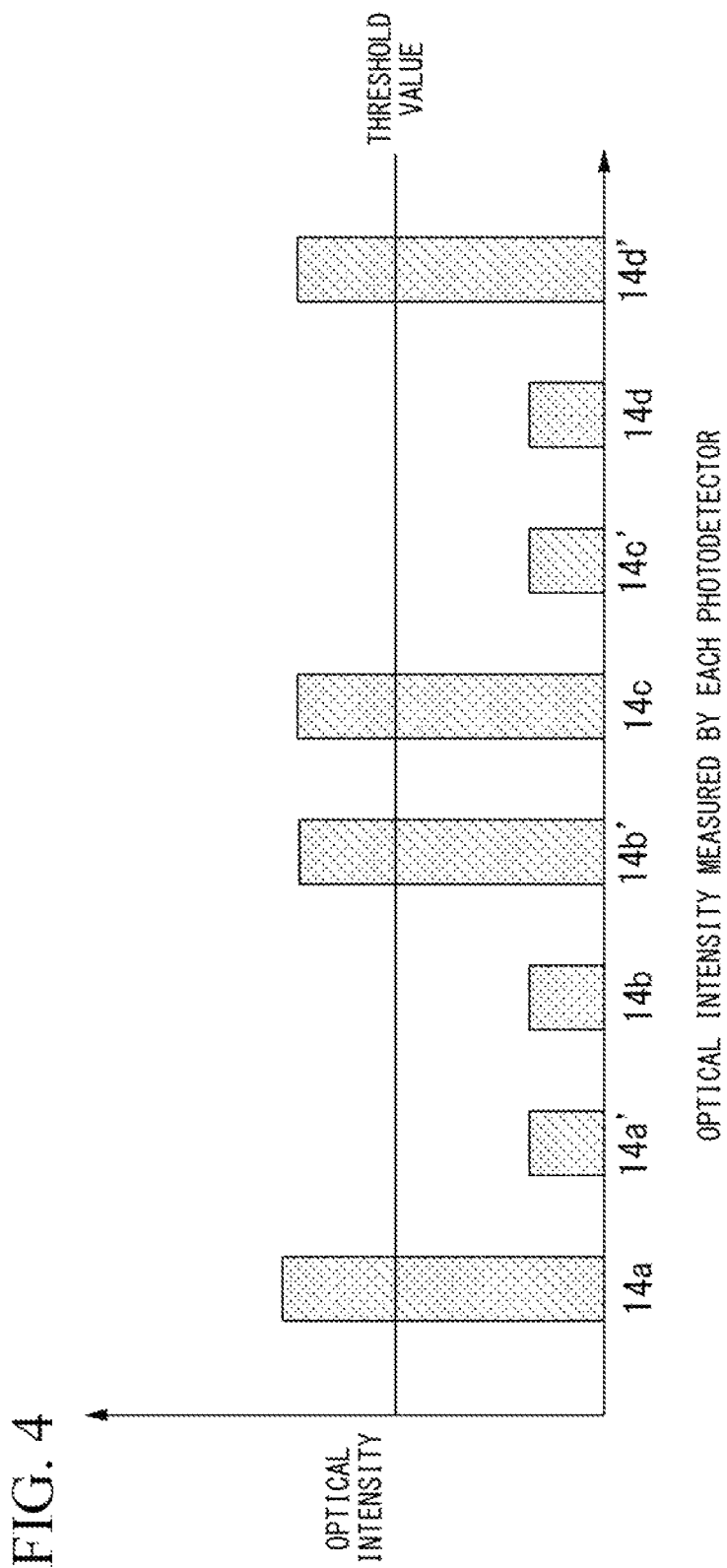
FIG. 4 is a diagram indicating the relationship between a threshold value and optical intensities detected by photodetectors in the first example embodiment of the present disclosure.

FIG. 4 is a diagram indicating the relationship between a threshold value and the optical intensities detected by the photodetectors in the first example embodiment.

FIG. 4 indicates the optical intensities detected by the photodetectors 14a and 14a'. The transmission direction determination unit 200 compares the optical intensities at the photodetectors 14a and 14a'. The transmission direction determination unit 200 determines that the signal light 17a is propagating from the core 11a to the core 12a because the optical intensity detected by the photodetector 14a is greater than the optical intensity detected by the photodetector 14a'.

Similarly, as illustrated in FIG. 1, the signal light 17b propagates from the core 12b to the core 11b and a part of the light is reflected by the reflective surface of the mirror 13 on the side of the multi-core fiber 12, thereby generating reflected light 17b". The photodetector 14b' measures the optical intensity of the reflected light 17b".

Meanwhile, since the signal light is not propagating from the core 11b to the core 12b, there is no light (i.e., reflected light 17b') reflected at the reflective surface of the mirror 13 on the side of the multi-core fiber 11. Therefore, almost no optical intensity is detected by the photodetector 14b.

FIG. 4 indicates the optical intensities detected by the photodetectors 14b and 14b'. The transmission direction determination unit 200 determines that the signal light 17b is propagating from the core 12b to the core 11b because the optical intensity detected by the photodetector 14b' is greater than the optical intensity detected by the photodetector 14b.

The determination of the transmission direction of the signal light 17c, 17d illustrated in FIG. 2, like that in FIG. 1, also involves the transmission direction determination unit 200 comparing the optical intensities detected by the photodetectors 14c, 14c' to determine that the transmission direction of the signal light 17c is from the core 11c to the core 12c. Additionally, the transmission direction determination unit 200 compares the optical intensities of the photodetectors 14d, 14d' to determine that the transmission direction of the signal light 17d is from the core 12d to the core 11d. The optical intensities measured by the photodetectors 14c, 14c', 14d, and 14d' are illustrated in FIG. 4.

Figure 5:
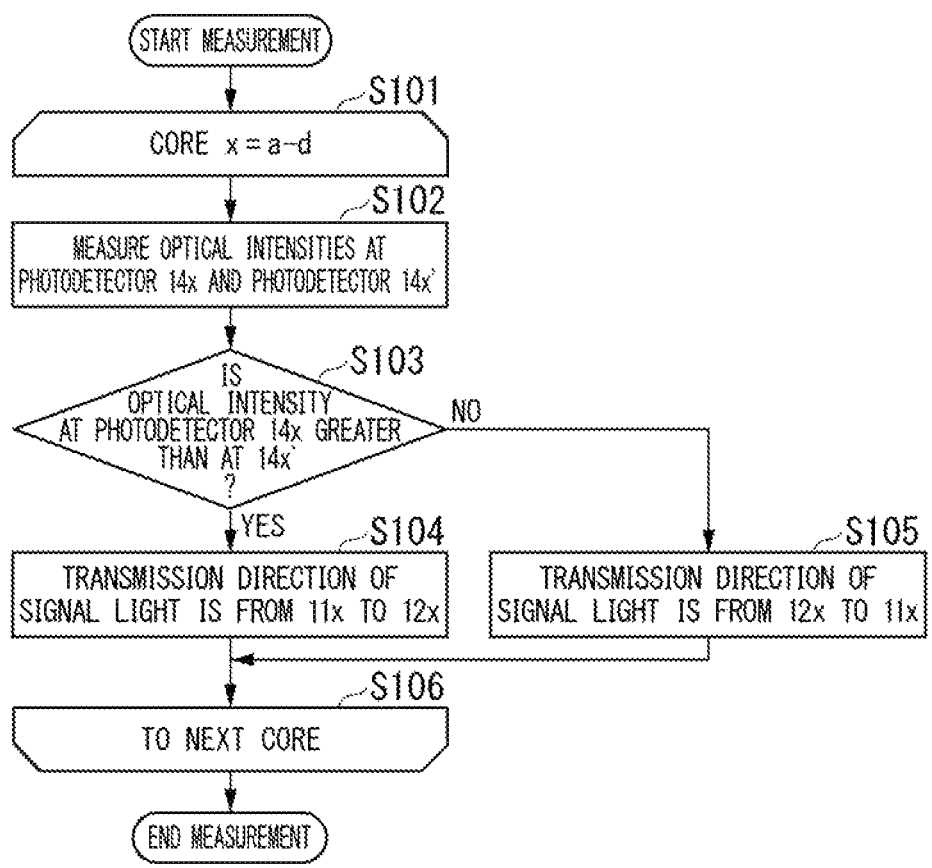
FIG. 5 is a diagram indicating a first flow chart of a process for determining the propagation direction of signal light in the first example embodiment of the present disclosure.

FIG. 5 is a diagram indicating a first flow chart of the process for determining the propagation direction of signal light in the first example embodiment.

The transmission direction determination unit 200 substitutes one of a-d for the identifier x, and starts the process for the core x (step S101). The transmission direction determination unit 200 measures the optical intensities detected by the photodetector 14x and the photodetector 14x' detecting the signal light in the core x (step S102). The transmission direction determination unit 200 determines whether the optical intensity detected by the photodetector 14x is greater than the optical intensity detected by the photodetector 14x' (step S103). In the case in which the optical intensity detected by the photodetector 14x is greater than the optical intensity detected by the photodetector 14x', the transmission direction determination unit 200 determines that the transmission direction of the signal light is from the core 11x of the multi-core fiber 11 to the core 12x of the multi-core fiber 12 (step S104). In the case in which the optical intensity detected by the photodetector 14x cannot be determined to be greater than the optical intensity detected by the photodetector 14x', the transmission direction determination unit 200 determines that the transmission direction of the signal light is from the core 12x of the multi-core fiber 12 to the core 11x of the multi-core fiber 11 (step S105). In the case in which there is a subsequent symbol that has not been set (a symbol that has not been set among a-d) as the identifier x, the transmission direction determination unit 200 determines that the process is to be performed for the subsequent identifier (step S106).

A function may be provided for issuing a signal providing a notification that a malfunction has been detected, on the assumption that some sort of malfunction has occurred in transmission, in the case in which, for the set of photodetectors 14 for determining the transmission direction in the transmission direction determination unit 200, neither of the signals is greater than the optical intensity threshold value indicated in FIG. 4, or both of the signals are greater than the threshold value.

Figure 6:
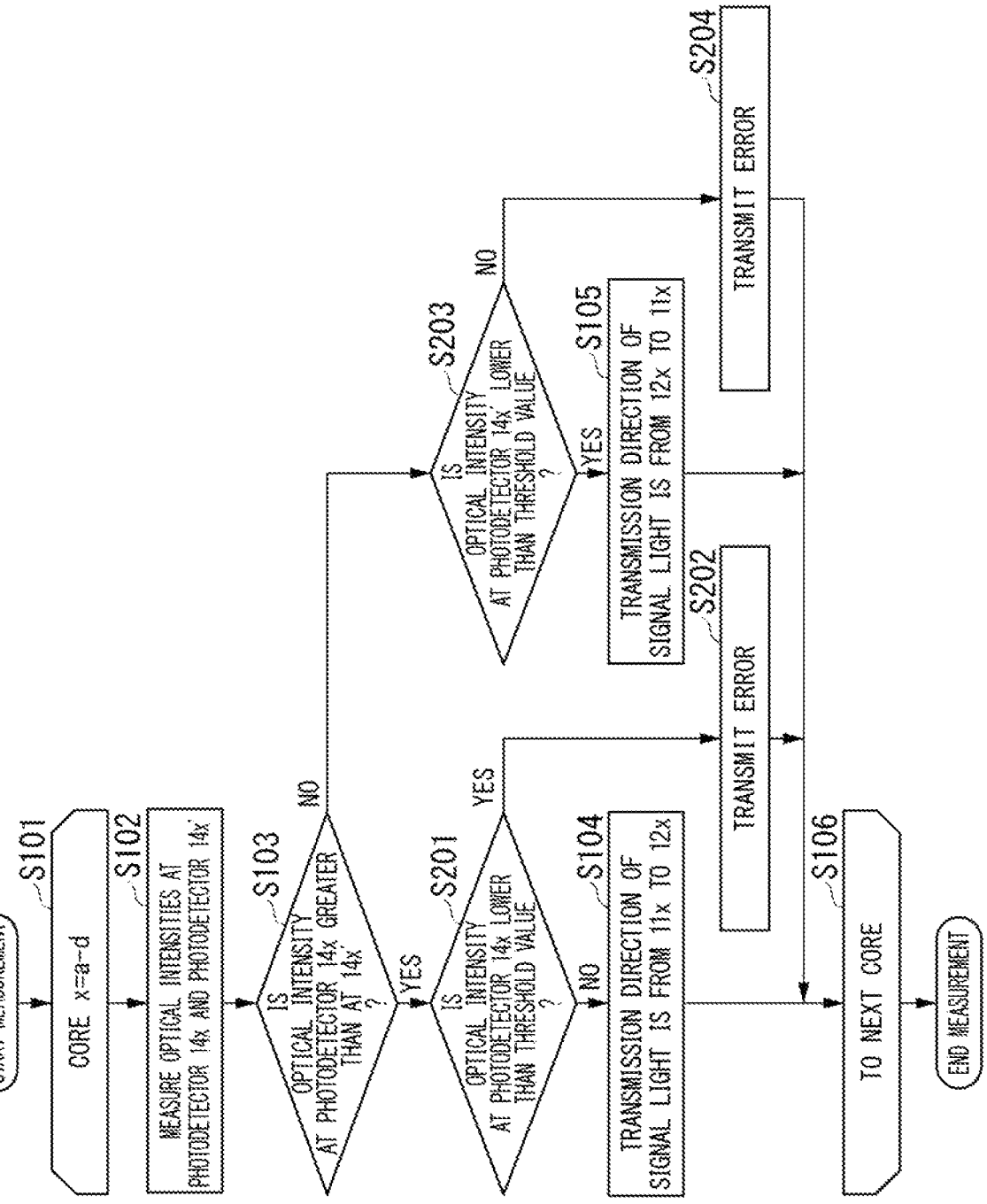
FIG. 6 is a second flow chart of a process for determining the propagation direction of signal light in the first example embodiment of the present disclosure.

FIG. 6 is a diagram indicating a second flow chart of the process for determining the propagation direction of signal light in the first example embodiment. The process indicated below may be performed after the process in step S103 in step S101 to step S106 described above. That is, in the case in which the optical intensity detected by the photodetector 14x is greater than the optical intensity detected by the photodetector 14x' in step S103, the transmission direction determination unit 200 determines whether the optical intensity detected by the photodetector 14x is lower than a threshold value (step S201). In the case in which the optical intensity detected by the photodetector 14x is not lower than the threshold value, the transmission direction determination unit 200 determines that the transmission direction of the signal light is from the core 11x of the multi-core fiber 11 to the core 12x of the multi-core fiber 12, as in step S104. In the case in which the optical intensity detected by the photodetector 14x is lower than the threshold value, the transmission direction determination unit 200 determines that an error has occurred, and transmits an error signal to a prescribed output destination (step S202).

In the case in which the optical intensity detected by the photodetector 14x cannot be determined to be greater than the optical intensity detected by the photodetector 14x' in step S103, the transmission direction determination unit 200 determines whether the optical intensity detected by the photodetector 14x' is lower than the threshold value (step S203). In the case in which the optical intensity detected by the photodetector 14x' is not lower than the threshold value, the transmission direction determination unit 200 determines that the transmission direction of the signal light is from the core 12x of the multi-core fiber 12 to the core 11x of the multi-core fiber 11, as in step S105. In the case in which the optical intensity detected by the photodetector 14x' is lower than the threshold value, the transmission direction determination unit 200 determines that an error has occurred, and transmits an error signal to the prescribed output destination (step S204).

Explanation of Effects

As described above, in the first example embodiment of the present disclosure, the photodetectors 14a-14d are disposed on the side of one reflective surface of the mirror 13, and the photodetectors 14a'-14d' are disposed on the side of the other surface. Thus, the transmission direction of the signal light propagating through each core can be determined at a single location. In related technology, partially reflective mirrors must be inserted at two locations on the transmission path in order to determine the transmission directions of the signal light. In contrast, in the present disclosure, a partially reflective mirror (mirror 13) is inserted at a single location on the transmission path. Thus, the optical loss can be decreased to half, etc., and the apparatus size of the transmission direction determination apparatus 1 can also be reduced to half, etc.

Second Example Embodiment (Explanation of Structure)

Figure 7:
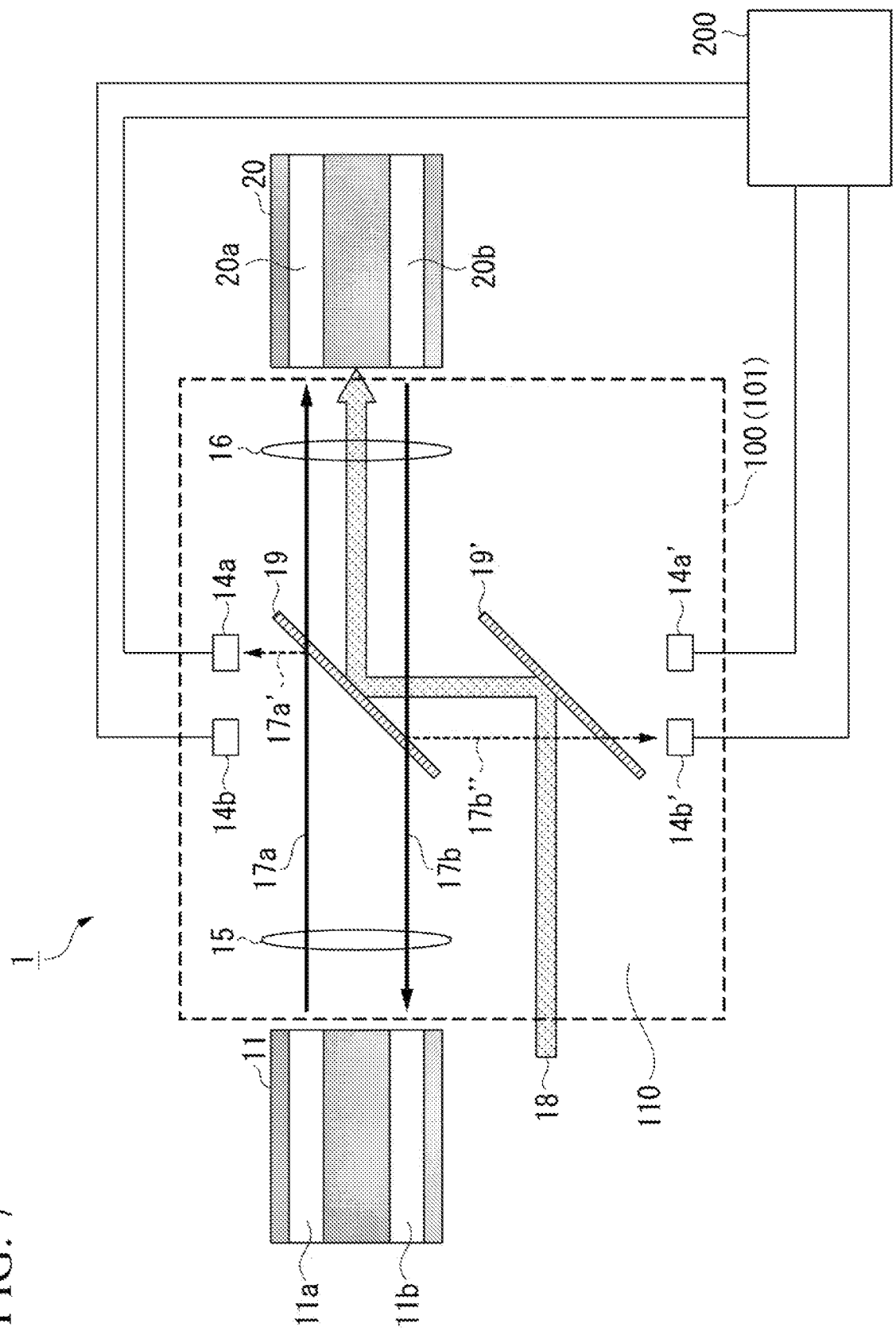
FIG. 7 is a schematic diagram of a transmission direction determination apparatus according to a second example embodiment of the present disclosure.

FIG. 7 is a first schematic diagram of a transmission direction determination apparatus according to a second example embodiment of the present disclosure.

Figure 8:
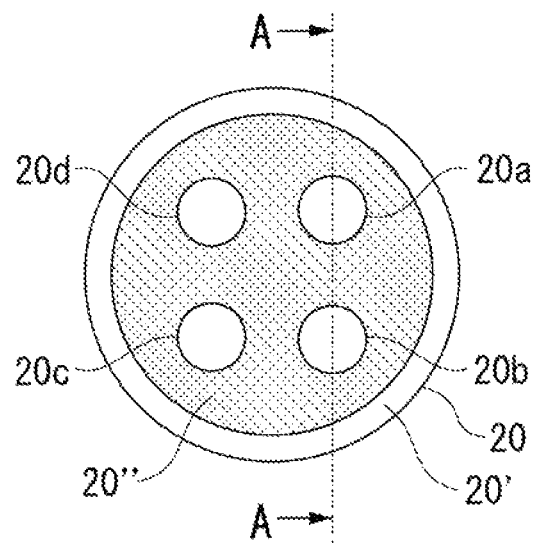
FIG. 8 is a schematic section view of a rare earth-doped multi-core fiber.

FIG. 7 is a schematic diagram focusing on the cores 11a, 11b in a section view along the line A-A of the multi-core fiber 11 illustrated in FIGS. 3A and 3B, and on the cores 20a, 20b in a section view along the line A-A of the rare earth-doped multi-core fiber illustrated in FIG. 8. The present example embodiment will be explained in accordance with FIG. 7 in order to simplify the explanation.

As illustrated in FIG. 7, compared with the first example embodiment, in the second example embodiment, the multi-core fiber 12 is changed to a rare earth-doped multi-core fiber 20. Additionally, the second example embodiment differs from the first example embodiment in that the optics unit 100 according to the second example embodiment has, instead of the mirror 13, dichroic mirrors 19 and 19' having the property of transmitting or partially reflecting the signal light at each of front and rear reflective surfaces like the mirror 13, and also reflecting excitation light 18.

The dichroic mirror 19' according to the second example embodiment is a dichroic mirror that reflects light (excitation light) in a wavelength region shorter than the wavelength region of the signal light on at least one surface (for example, the surface of the dichroic mirror 19 on the side of the multi-core fiber 20 in FIG. 7 and the surface of the dichroic mirror 19' on the side of the dichroic mirror 19 in FIG. 7).

Figure 10:
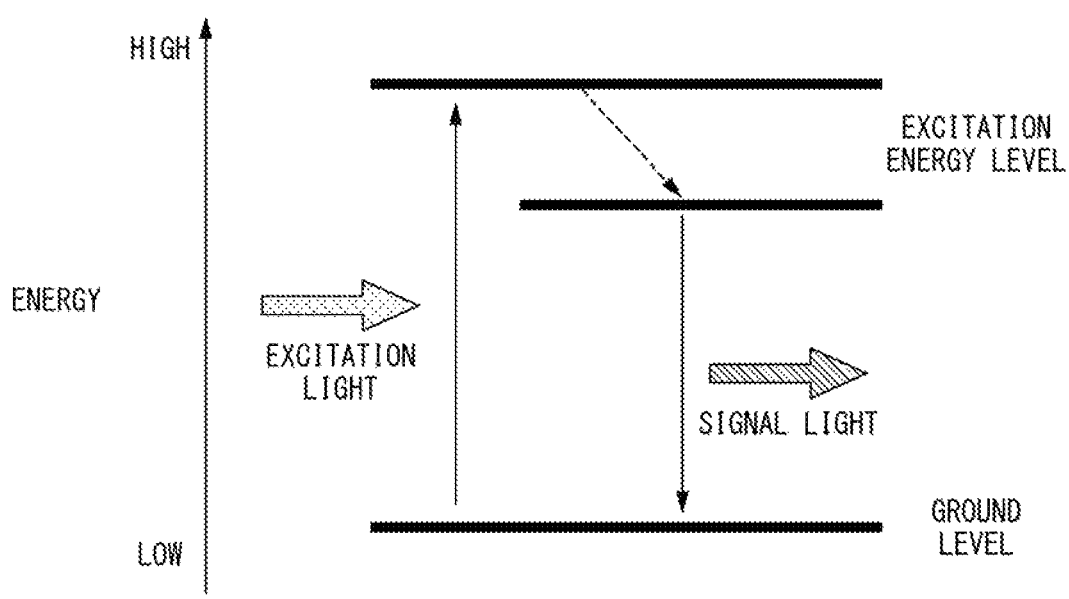
FIG. 10 is a diagram indicating the energy levels of a rare-earth element with which the multi-core fiber according to the present example embodiment is doped.

FIG. 8 is a schematic section view of the rare earth-doped multi-core fiber 20. The rare earth-doped multi-core fiber 20 is composed of an outer cladding 20', an inner cladding 20", and cores 20a-20d. The signal light propagates in the cores 20a-20d, and these cores are doped with a rare earth element that fluoresces in the wavelength region of the signal light. In this rare earth-doped multi-core fiber 20, when excitation light 18 having a wavelength different from the signal light enters the inner cladding 20", the rare earth element with which the cores 20a-20d are doped absorbs the excitation light 18, and the energy from the absorbed excitation light raises the electron energy level of the rare-earth element (see FIG. 10). This state is referred to as the excitation state, and the excitation state transitions to a lower energy level with a fixed probability, and at this time, the rare earth element emits fluorescent light in the same wavelength region as the signal light.

As described above, the transmission direction determination apparatus 1 according to the second example embodiment has a configuration for inputting, to the inner cladding 20" of the rare earth-doped multi-core fiber 20, which is doped with a rare earth element that emits fluorescent light in the same wavelength region as the signal light for the purpose of amplifying the light, excitation light 18 for exciting the rare earth element to the excitation state. By inputting the signal light to the cores 20a-20d in this way, the rare earth-doped multi-core fiber 20 amplifies the signal light that is transmitted.

Referring again to FIG. 7, the dichroic mirrors 19, 19' have the property of transmitting the signal light 17a, 17b and reflecting the excitation light 18, which has a shorter wavelength than the signal light. The dichroic mirror 19 cannot fully transmit the signal light 17a, 17b, and part (a prescribed percentage) of the signal light 17a (17b) is reflected by the dichroic mirror 19 on the side of the multi-core fiber 11 (20), thereby creating reflected light 17a' (17b").

Figure 9:
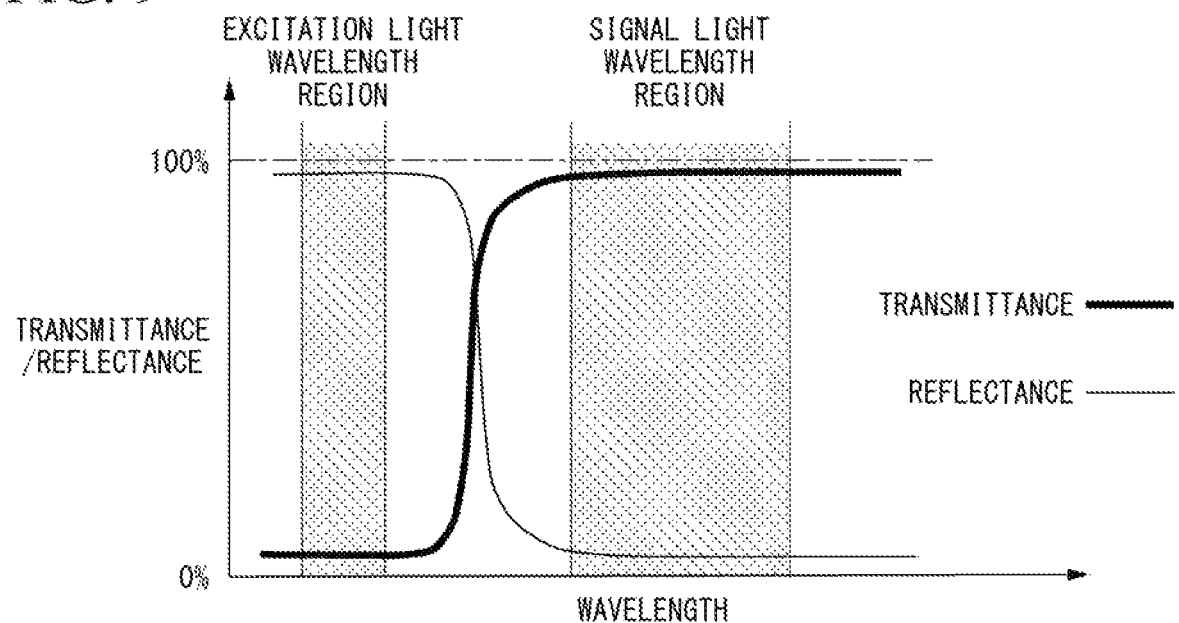
FIG. 9 is a diagram indicating the transmittance and reflectance of a dichroic mirror according to a second example embodiment of the present disclosure.

FIG. 9 is a diagram indicating the change in the transmittance and reflectance of the dichroic mirrors 19 and 19' according to the second example embodiment of the present disclosure. The dichroic mirrors 19 and 19' transmit most of the light in the wavelength region of the signal light, and reflect part (a prescribed percentage) of the light. As indicated in FIG. 9, the signal light is not fully transmitted, and part (a prescribed percentage, i.e., approximately 1%) of the signal light input to the dichroic mirror 19 (19') is reflected. The ratio between transmission and reflection is approximately the same as that in a 20 dB optical coupler that is generally used to reference signal light. Additionally, as indicated in FIG. 9, the dichroic mirrors 19 and 19' almost fully reflect and transmit a part (a prescribed percentage, such as only approximately 1%) of the excitation light in a wavelength region of the excitation light, which has a shorter wavelength than the signal light.

The determination of the transmission direction by the transmission direction determination unit 200 of the second example embodiment is performed in accordance with the flow charts indicated in FIG. 5 and FIG. 6, as in the first example embodiment.

Since the reflected light 17a"-17d" is reflected light of the signal light optically amplified by the rare earth-doped multi-core fiber 20, the optical intensity thereof is higher than that of the reflected light 17a'-17d', which has been reflected at the reflective surface of the dichroic mirror 19 on the side of the multi-core fiber 11. Therefore, the reflected light 17a"-17d" has intensities of a level that can be detected by the photodetectors 14a'-14d' even if optical loss occurs when the reflected light 17a"-17d" is transmitted through the dichroic mirror 19'.

Explanation of Effects

In the second example embodiment of the present disclosure, the excitation light can be separated from the signal light by using the dichroic mirrors 19 and 19', allowing the photodetectors 14a-14d and the photodetectors 14a'-14d' to detect only the signal light. As a result thereof, the transmission direction of the signal light propagating through each core can be determined even near optical amplifiers. In related technology, partially reflective mirrors must be inserted at two locations on the transmission path in order to determine the transmission directions of the signal light. In contrast, in the transmission direction determination apparatus 1 disclosed herein, a partially reflective mirror (dichroic mirror 19) is inserted at one location on the transmission path. Thus, the optical loss can be decreased to half, etc., and the apparatus size of the transmission direction determination apparatus 1 can also be reduced to half, etc.

Third Example Embodiment (Explanation of Structure)

Figure 11:
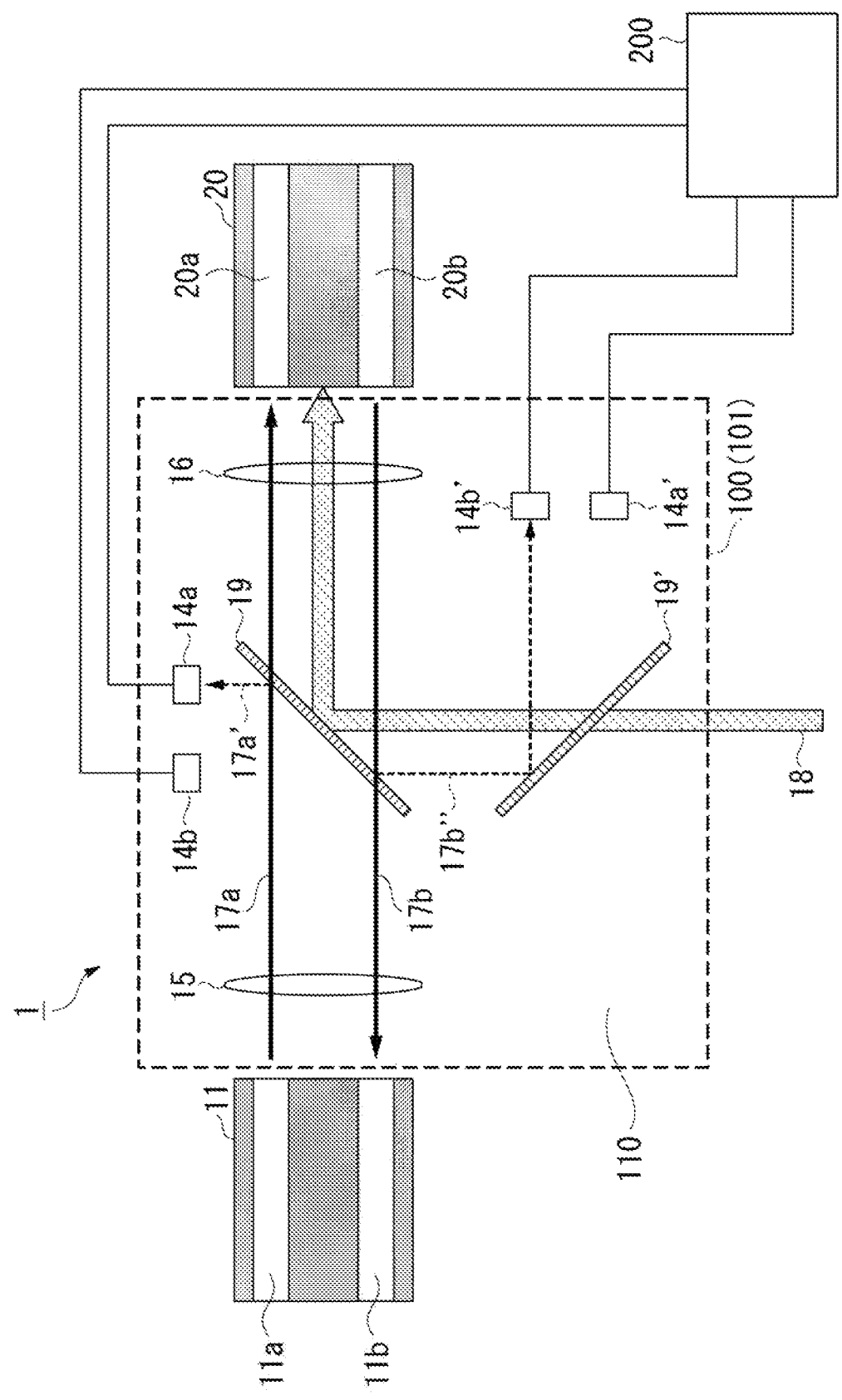
FIG. 11 is a schematic diagram of a transmission direction determination apparatus according to a third example embodiment of the present disclosure.

FIG. 11 is a schematic diagram focusing on the cores 11a, 11b in a section view along the line A-A illustrated in FIG. 3A, and on the cores 20a, 20b in a section view along the line A-A of the rare earth-doped multi-core fiber illustrated in FIG. 8. The present example embodiment will be explained in accordance with FIG. 11 in order to simplify the explanation.

Figure 12:
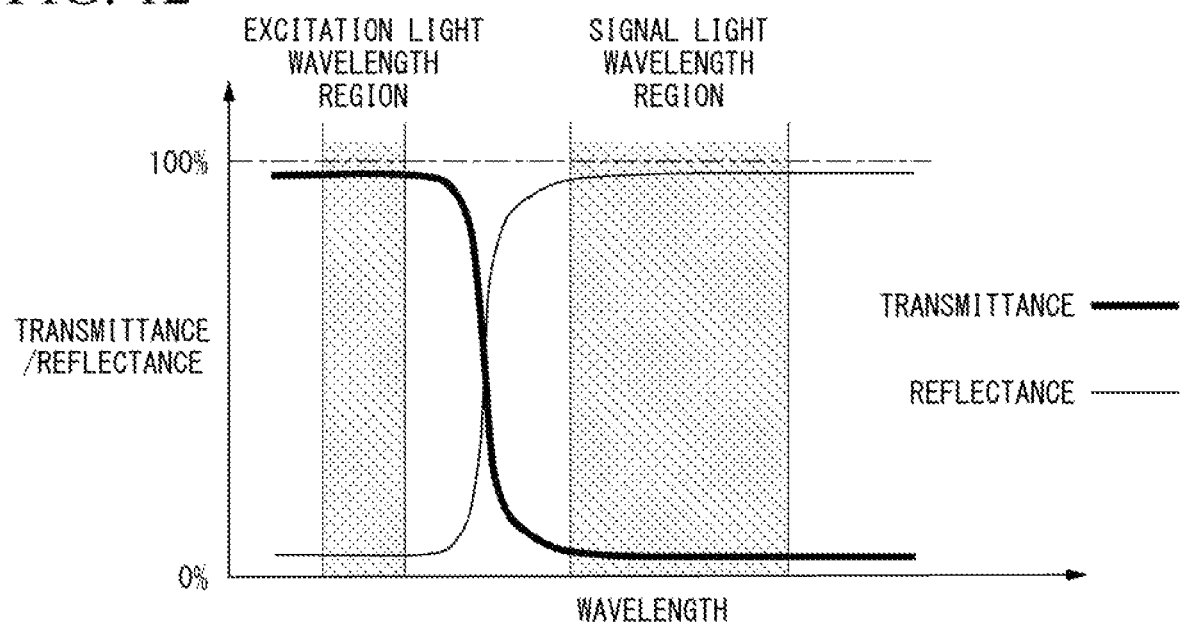
FIG. 12 is a diagram illustrating the transmittance and reflectance of a dichroic mirror according to a third example embodiment of the present disclosure.

As illustrated in FIG. 11, the optics unit 100 according to the third example embodiment, compared to the optics unit 100 according to the second example embodiment, differs in that a dichroic mirror 19' having the property of transmitting the excitation light 18 and reflecting the signal light is provided. As illustrated in FIG. 12, the dichroic mirror 19' has the property of reflecting the signal light wavelength region and transmitting the excitation light wavelength region.

FIG. 12 indicates the change in the transmittance and reflectance of the dichroic mirror 19' depending on wavelength. The dichroic mirror 19' transmits most of the light in the wavelength region of the excitation light, and reflects part (a prescribed percentage, i.e., approximately 1%) of the excitation light. As indicated in FIG. 12, in the wavelength region of the signal light, which has a longer wavelength than the excitation light, the dichroic mirror 19' almost fully reflects and transmits part (a prescribed percentage, such as only approximately 1%) of the signal light.

The determination of the transmission direction by the transmission direction determination unit 200 of the third example embodiment is performed in accordance with the flow charts indicated in FIG. 5 and FIG. 6, as in the first example embodiment.

Explanation of Effects

In the third example embodiment of the present disclosure, the angle of the dichroic mirror 19 can be adjusted so as to maximize the optical intensities detected at the photodetectors 14a-14d when light is input from the cores 11a-11d of the multi-core fiber 11, and the angle of the dichroic mirror 19' can be adjusted so as to maximize the optical intensities detected at the photodetectors 14a'-14d' when light is input from the cores 20a-20d of the rare earth-doped multi-core fiber 20. There is a need to optimize the path of light incident on the photodetectors 14a-14d and 14a'-14d' by the angle of a single mirror 13 (partially reflective mirror) in the first example embodiment and a single dichroic mirror 19 in the second example embodiment. In contrast, in the third example embodiment, the mirror angles of the two dichroic mirrors 19, 19' can be adjusted, allowing the installation positions of the photodetectors 14a-14d and the photodetectors 14a'-14d' to be optimized independently.

Fourth Example Embodiment (Explanation of Structure)

Figure 13:
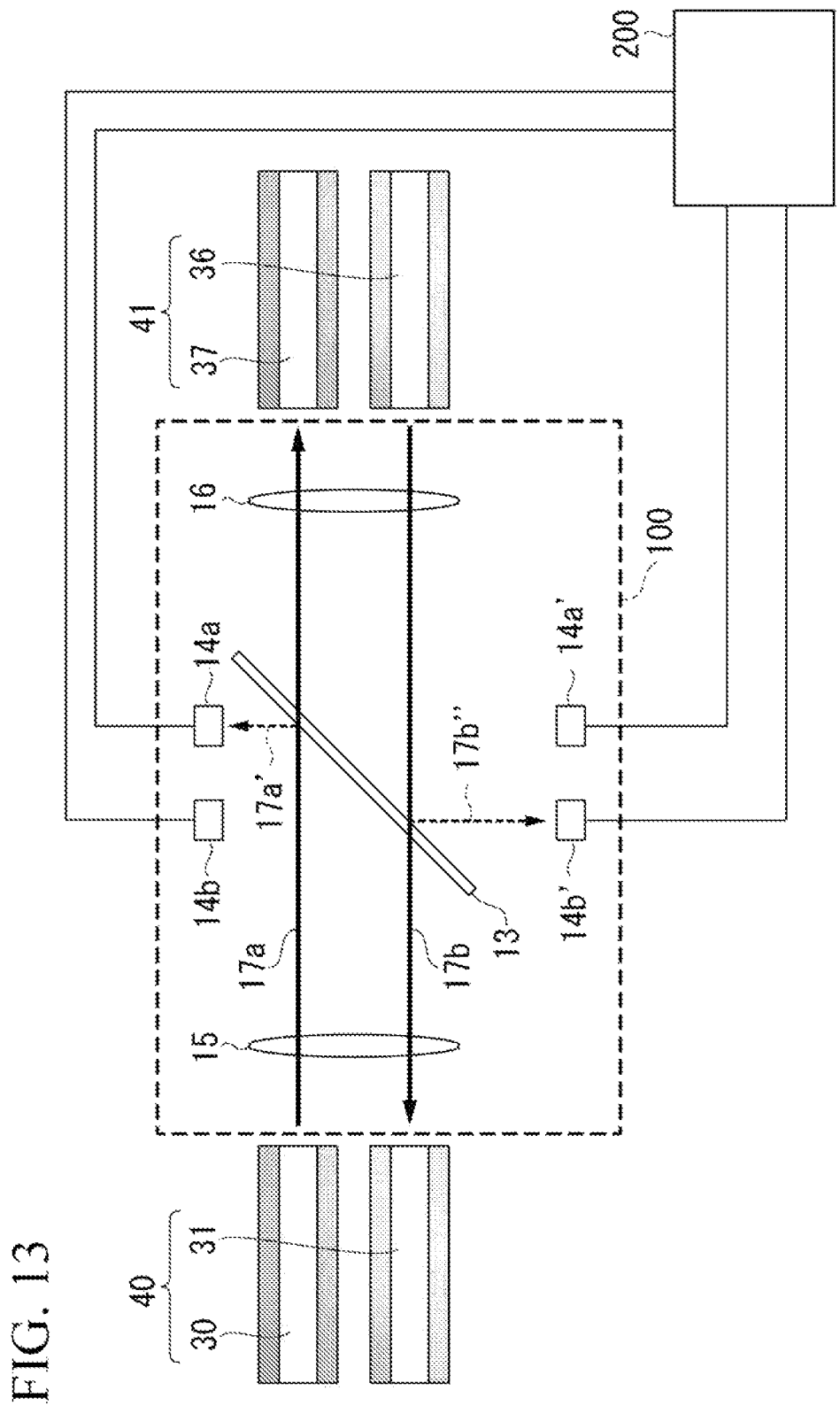
FIG. 13 is a schematic diagram of a transmission direction determination apparatus according to a fourth example embodiment of the present disclosure.

FIG. 13 is a schematic diagram of a transmission direction determination apparatus according to a fourth example embodiment.

As illustrated in FIG. 13, in the transmission direction determination apparatus according to the fourth example embodiment, the optics unit 100 is installed between optical fiber bundles 40 and 41, in which optical fibers are bundled.

Figure 14A:
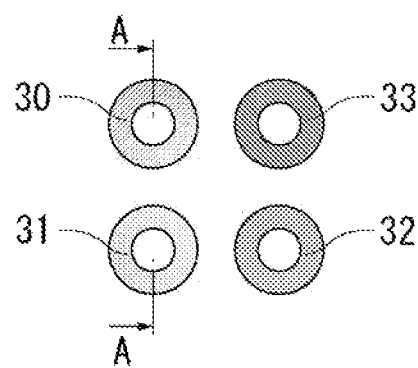
FIG. 14A is a schematic section view of an optical fiber bundle according to a fourth example embodiment of the present disclosure.
Figure 14B:
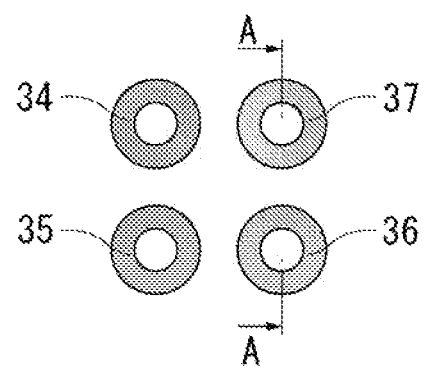
FIG. 14B is a schematic section view of an optical fiber bundle according to a fourth example embodiment of the present disclosure.

FIG. 14 illustrates a schematic section view of the optical fiber bundles 40 and 41. The optical fiber bundle 40 is composed of optical fibers 30-33, and the optical fiber bundle 41 is similarly composed of optical fibers 34-37. Although the optical fibers constituting the optical fiber bundles 40 and 41 illustrated in FIG. 14 are single-core fibers for the purpose of explanation, in the case of actual use, the types of optical fibers are not fixed and they may be single-core or multi-core fibers, or they may be a mixture of single-core and multi-core fibers. Additionally, although the optical fiber bundles 40, 41 are bundles of four optical fibers for the purpose of explanation, there are no constraints on the number of optical fibers and the bundling method in the case of actual use.

The explanation below will be performed by using FIG. 13, which is a schematic view focusing on the optical fibers 30, 31, 36, and 37 in a cross-section along the line A-A illustrated in FIG. 14.

The signal light propagating from the optical fiber 30 to the optical fiber 37 will be referred to as a signal light 17a, and the signal light propagating from the optical fiber 36 to the optical fiber 31 will be referred to as a signal light 17b.

The mirror 13 is a partially reflective mirror having the property of reflecting part of the signal light 17a, 17b, as in the first example embodiment.

The photodetectors 14a, 14b are installed at locations at which the reflected light 17a' obtained by the signal light 17a being reflected at the reflective surface of the partially reflective mirror 13 on the side of the multi-core fiber bundle 40 can be detected. Additionally, it is preferable to provide the same number of photodetectors 14a, 14b as the number of optical fibers in the case in which the optical fibers used for transmission are single-core fibers, and to provide the same number as the number of cores in the multi-core fibers multiplied by the number of multi-core fibers in the case in which the optical fibers are multi-core fibers.

The photodetectors 14a', 14b' are installed at locations at which the reflected light 17b'' obtained by the signal light 17b being reflected at the reflective surface of the partially reflective mirror 13 on the side of the multi-core fiber bundle 41 can be detected. Additionally, it is preferable to provide the same number of photodetectors 14a', 14b' as the number of optical fibers in the case in which the optical fibers used for transmission are single-core fibers, and to provide the same number as the number of cores in the multi-core fibers multiplied by the number of multi-core fibers in the case in which the optical fibers are multi-core fibers.

The determination of the transmission direction by the transmission direction determination unit 200 in the fourth example embodiment is performed in accordance with the flow charts indicated in FIG. 5 and FIG. 6, as in the first example embodiment.

Explanation of Effects

In the fourth example embodiment of the present disclosure, the propagation direction of the signal light propagating through each core in a fiber bundle, which is a bundle of multiple optical fibers, can be identified. In related technology, when there were multiple optical fibers, there was a need to install a transmission direction identification module for each optical fiber. In contrast, in the present example embodiment, multiple optical fibers are bundled, allowing transmission direction identification modules to be collectively installed at a single location, thereby reducing the apparatus installation size.

Fifth Example Embodiment

Figure 15:
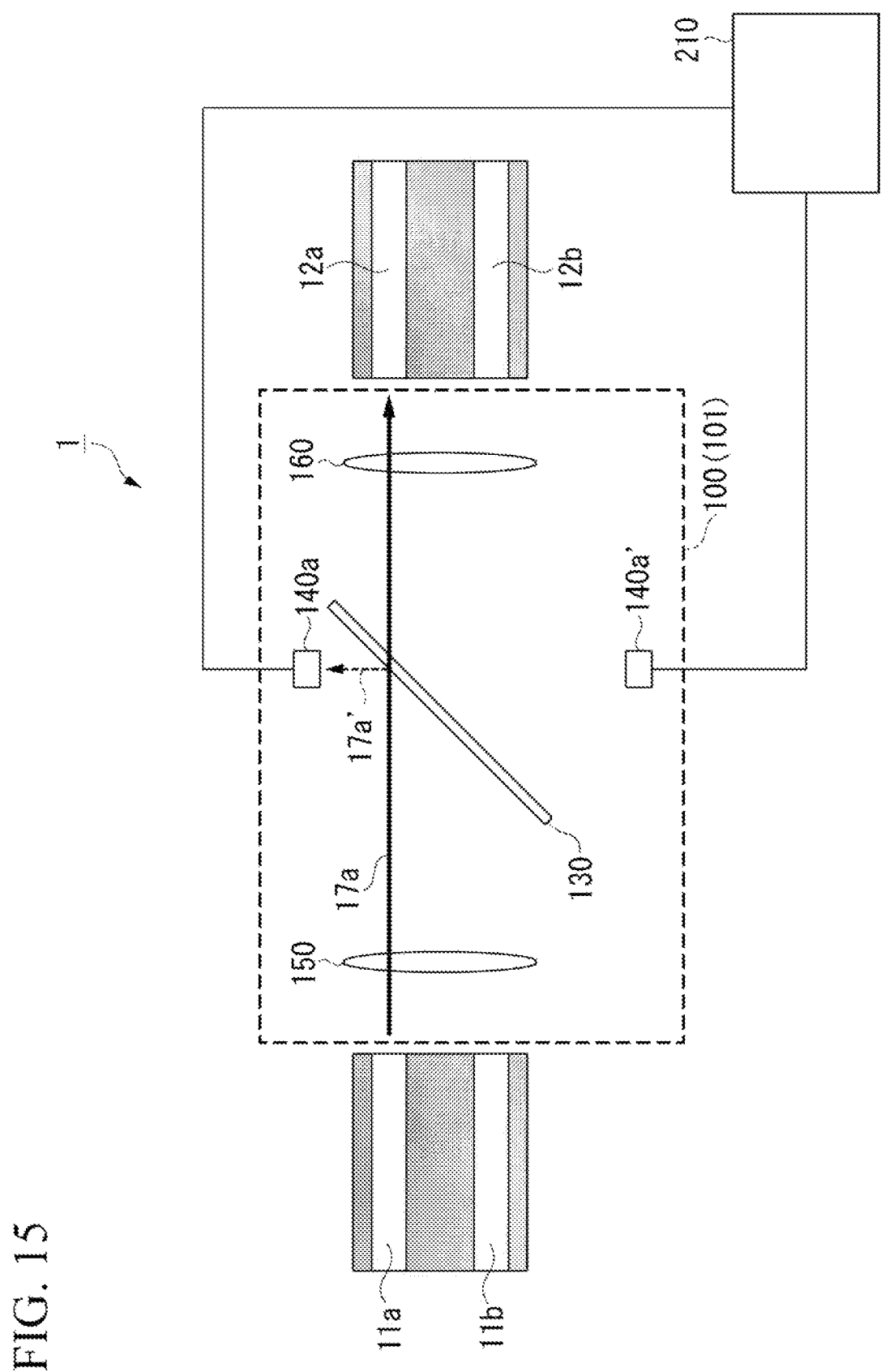
FIG. 15 is a functional block diagram illustrating a configuration of a transmission direction determination apparatus.

FIG. 15 is a functional block diagram illustrating a configuration of the transmission direction determination apparatus.

Figure 16:
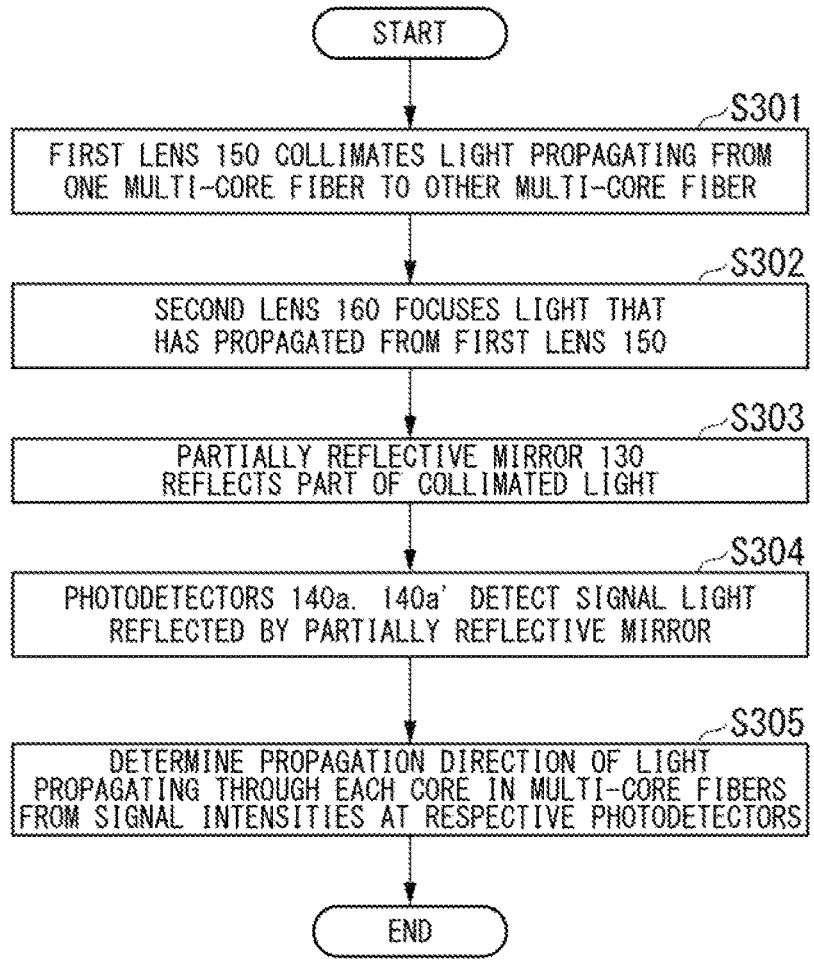
FIG. 16 is a diagram indicating the processing flow according to the transmission direction determination apparatus shown in FIG. 15.

FIG. 16 is a diagram indicating the processing flow by the transmission direction determination apparatus of FIG. 15.

The transmission direction determination apparatus 1 is composed of at least an optics unit 100 (transmission direction determination module 101) including a first lens 150, a second lens 160, a partially reflective mirror 130 and photodetectors 140a, 140a', and a transmission direction determining means 210.

The first lens 150 collimates light propagating from one multi-core fiber to another multi-core fiber (step S301).

The second lens 160 focuses the light that has propagated from the first lens 150 (step S302).

The partially reflective mirror 130 reflects part of the collimated light (step S303).

In order to measure the intensities of the signal light reflected by the partially reflective mirror 130, the photodetectors 140a, 140a' are disposed on a side of one surface of the partially reflective mirror and on a side of the other surface of the partially reflective mirror, and detect the reflected signal light (step S304).

The transmission direction determining means 210 determines the transmission direction of the light propagating through each core in the multi-core fiber from the signal intensities at the respective photodetectors 140a and 140a' (step S305).

In each of the abovementioned example embodiments, a single-core optical fiber can be used instead of the multi-core fiber. In this case, the transmission direction determination apparatus 1 may similarly determine the transmission direction of the signal light being transmitted by the core in the optical fiber.

(Hardware Configuration)

Figure 17:
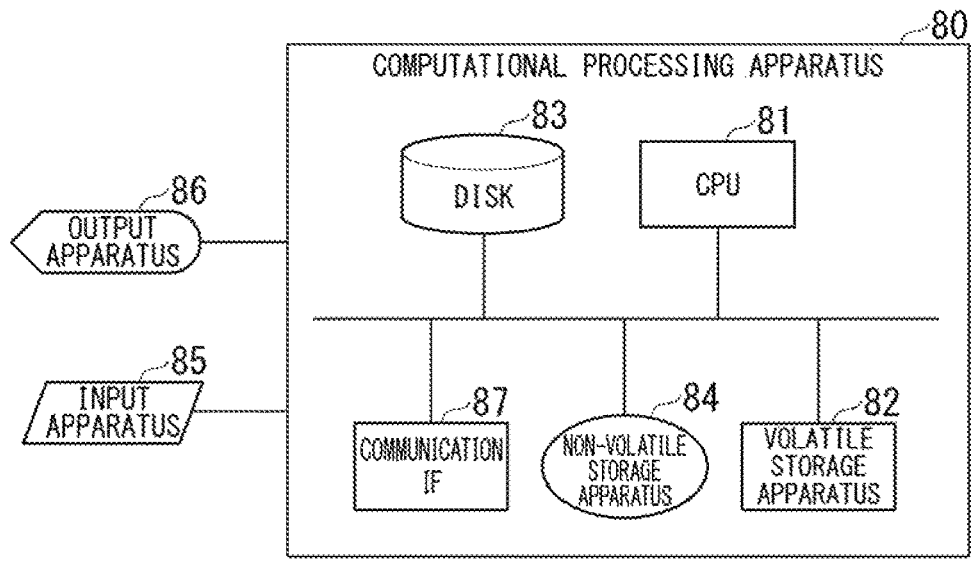
FIG. 17 is a block diagram schematically illustrating a hardware configuration example for a computational processing apparatus capable of realizing a transmission direction determination unit (transmission direction determining means).

FIG. 17 is a block diagram schematically illustrating an example of the hardware configuration of a computational processing apparatus 80 capable of realizing the transmission direction determination unit 200 (transmission direction determining means 210) according to the respective example embodiments disclosed herein.

An example of the configuration of hardware resources for realizing the transmission direction determination unit 200 (transmission direction determining means 210) by using a single computational processing apparatus (information processing apparatus, computer) will be explained.

The computational processing apparatus 80 may be connectable to a central processing apparatus (central processing unit, hereinafter referred to as a "CPU") 81, a volatile storage apparatus 82, a disk 83, a non-volatile storage medium 84, and a communication interface (hereinafter referred to as "communication IF") 87. The computational processing apparatus 80 may be connectable to an input apparatus 85 and an output apparatus 86. The computational processing apparatus 80 can exchange information with other computational processing apparatuses and with communication apparatuses via the communication IF (interface) 87.

The non-volatile recording medium 84 is, for example, a compact disc or a digital versatile disc that can be read by a computer. Additionally, the non-volatile recording medium 84 may be a universal serial bus memory (USB memory), a solid-state drive, etc. The non-volatile recording medium 84 allows programs to be held and carried even without supplying electric power. The non-volatile recording medium 84 is not limited to the media mentioned above. Additionally, instead of the non-volatile recording medium 84, the program may be carried over the communication IF 87 and a communication network.

The volatile storage apparatus 82 can be read by a computer and can temporarily store data. The volatile storage apparatus 82 is a memory, etc. such as a DRAM (dynamic random access memory) or an SRAM (static random access memory).

That is, when executing a software program (computer program, hereinafter referred to simply as a "program") stored on a disk 83, the CPU 81 copies the program to the volatile storage apparatus 82 and executes computational processes. The CPU 81 reads data necessary for executing the program from the volatile storage apparatus 82. In the case in which a display is necessary, the CPU 81 displays output results on the output apparatus 86. In the case in which the program is input from the outside, the CPU 81 reads the program from the input apparatus 85. The CPU 81 interprets and executes an analysis program (FIG. 4 or FIG. 5) located in the volatile storage apparatus 82, which corresponds to the functions (processes) represented by the respective units illustrated in FIG. 2 (or FIGS. 3A and 3B). The CPU 81 executes the processes explained in the above-mentioned example embodiments. That is, in such cases, the above-mentioned example embodiments can be understood to be implementable by the relevant analysis program. Furthermore, the respective example embodiments disclosed herein can be understood as being implementable by a computer-readable, non-volatile recording medium in which the relevant analysis program is recorded.

The transmission direction determination unit 200 (transmission direction determining means 210) may be composed of an electronic circuit, an electric circuit, etc.

The whole or part of the example embodiments disclosed above can be described as, but not limited to, the following supplementary notes.

(Supplementary Note 1)

A transmission direction determination apparatus comprising:
  a first lens configured to collimate light propagating from one multi-core fiber of two multi-core fibers to the other multi-core fiber of the two multi-core fibers;
  a second lens configured to focus the light that has propagated from the first lens;
  a partially reflective mirror configured to reflect part of the collimated light and including a first surface and a second surface;
  a first photodetector disposed on a side of the first surface of the partially reflective mirror and configured to measure an intensity of signal light reflected by the partially reflective mirror;
  a second photodetector disposed on a side of the second surface of the partially reflective mirror and configured to measure an intensity of signal light reflected by the partially reflective mirror;
  a memory configured to store instructions; and
  a processor configured to execute the instructions to determine a transmission direction of light propagating through respective cores in the two multi-core fiber from the signal intensities measured by the first and second photodetectors.

(Supplementary Note 2)

The transmission direction determination apparatus according to supplementary note 1, wherein:
the first lens is configured to collimate light that is output from each of a plurality of cores in the one multi-core fiber of the two multi-core fibers opposing to each other, and that propagates to the other multi-core fiber;
the second lens is configured to focus the light that has propagated from the one lens, and focus the light output from each of the plurality of cores in the first multi-core fiber on a corresponding core in the other multi-core fiber;
the first and second surfaces of the partially reflective mirror are two reflective surfaces that are a front surface and a rear surface of the partially reflective mirror, each of the two reflective surfaces being configured to reflect a prescribed percentage of the collimated light output from the one multi-core fiber and the other multi-core fiber, the two reflective surfaces being configured to transmit the collimated light therethrough, except for the prescribed percentage of the light, in a direction heading the other multi-core fiber;
the first photodetector is configured to measure the intensity of the signal light reflected by one of the two partially reflective mirrors;
the second photodetector is configured to measure the intensity of the signal light reflected by the other photodetector of the two the partially reflective mirrors; and
the processor is configured to execute the instruction to determine a transmission direction of the light propagating between the two multi-core fibers based on the signal intensities measured by the first and second photodetectors.

(Supplementary Note 3)

The transmission direction determination apparatus according to supplementary note 2, wherein the partially reflective mirror is configured to transmit light in a wavelength region of signal light included in the light propagating from the one multi-core fiber to the other multi-core fiber therethrough, and reflect, at the reflective surfaces, the prescribed percentage of the light in the wavelength region of the signal light, the percentage being small in comparison with a percentage of the light transmitting through the partially reflective mirror.

(Supplementary Note 4)

The transmission direction determination apparatus according to supplementary note 2, wherein the partially reflective mirror is a dichroic mirror that is configured to transmit, at the front and rear surfaces, light in a wavelength region of signal light included in the light propagating from the one multi-core fiber to the other multi-core fiber, and to reflect, at the reflective surfaces, the prescribed percentage of the light in the wavelength region of the signal light, the percentage being small in comparison with a percentage of the light transmitting through dichroic mirror, the dichroic mirror being configured to reflect, at the one surface, light in a wavelength region shorter than the wavelength region of the signal light.

(Supplementary Note 5)

The transmission direction determination apparatus according to supplementary note 4, wherein:
the multi-core fiber is doped with a rare earth element in the cores, which are transmission paths for light;
the light in a wavelength region shorter than the wavelength region of the signal light is excitation light that raises electron energy levels in the cores doped with the rare earth element and puts the rare earth element in an excitation state; and
the second lens is configured to focus the excitation light on the other multi-core fiber.

(Supplementary Note 6)

The transmission direction determination apparatus according to any one of supplementary note 2 to supplementary note 5, wherein the processor is configured to execute the instructions to determine whether or not a signal intensity of light measured by the photodetectors is greater than or equal to a prescribed threshold value, determine a transmission direction of light propagating between the two multi-core fibers in a case in which the signal intensity of the light is greater than or equal to the prescribed threshold value, and output a signal indicating an error in a case in which the signal intensity of the light is less than the prescribed threshold value.

(Supplementary Note 7)

The transmission direction determination apparatus according to any one of supplementary note 2 to supplementary note 6, wherein the partially reflective mirror is fixed, between the two multi-core fibers, so as to reflect the prescribed percentage of light outside the transmission path of the signal light.

(Supplementary Note 8)

A transmission direction determination apparatus comprising:
a first lens configured to collimate light propagating from one optical fiber bundle including a plurality of optical fibers to another optical fiber bundle including a plurality of optical fibers;
a second lens configured to focus the light that has propagated from the first lens;
a partially reflective mirror configured to reflect part of the collimated light and including a first surface and a second surface;
a first photodetector disposed on a side of the first surface of the partially reflective mirror and configured to measure an intensity of signal light reflected by the partially reflective mirror;
a second photodetector disposed on a side of the second surface of the partially reflective mirror and configured to measure an intensity of signal light reflected by the partially reflective mirror;
a memory configured to store instructions; and
a processor configured to execute the instructions to determine a transmission direction of light propagating through respective cores in the two multi-core fiber from the signal intensities measured by the first and second photodetectors.

(Supplementary Note 9)

A transmission direction determination method comprising:
collimating, by a first lens, light propagating from one multi-core fiber of two multi-core fibers to the other multi-core fiber of the two multi-core fibers;
focusing, by a second lens, the light that has propagated from the first lens;
reflecting, by a partially reflective mirror, part of the collimated light;
measuring, by a first photodetector disposed on a side of a first surface of the partially reflective mirror, an intensity of signal light reflected by the partially reflective mirror;

measuring, by a second photodetector disposed on a side of a second surface of the partially reflective mirror, an intensity of signal light reflected by the partially reflective mirror; and determining, by a processor, a transmission direction of light propagating through respective cores in the two multi-core fiber from the signal intensities measured by the first and second photodetectors.

(Supplementary Note 10)

A non-transitory computer readable recording medium that stores a program for a computer, the computer comprising:

a first lens configured to collimate light propagating from one multi-core fiber of two multi-core fibers to the other multi-core fiber of the two multi-core fibers;

a second lens configured to focus the light that has propagated from the first lens;

a partially reflective mirror configured to reflect part of the collimated light and including a first surface and a second surface;

a first photodetector disposed on a side of the first surface of the partially reflective mirror and configured to measure an intensity of signal light reflected by the partially reflective mirror; and a second photodetector disposed on a side of the second surface of the partially reflective mirror and configured to measure an intensity of signal light reflected by the partially reflective mirror, wherein the program causes the computer to execute:

determining a transmission direction of light propagating through respective cores in the two multi-core fiber from the signal intensities measured by the first and second photodetectors.

(Supplementary Note 11)

A transmission direction determination module comprising:

a first lens configured to collimate light propagating from one multi-core fiber of two multi-core fibers to the other multi-core fiber of the two multi-core fibers;

a second lens configured to focus the light that has propagated from the first lens;

a partially reflective mirror configured to reflect part of the collimated light and including a first surface and a second surface;

a first photodetector disposed on a side of the first surface of the partially reflective mirror and configured to measure an intensity of signal light reflected by the partially reflective mirror; and a second photodetector disposed on a side of the second surface of the partially reflective mirror and configured to measure an intensity of signal light reflected by the partially reflective mirror.

What is claimed is:

1. A transmission direction determination apparatus comprising:

a first lens configured to collimate light propagating from one multi-core fiber of two multi-core fibers to the other multi-core fiber of the two multi-core fibers;

a second lens configured to focus the light that has propagated from the first lens;

a partially reflective mirror configured to reflect part of the collimated light and including a first surface and a second surface;

a first photodetector disposed on a side of the first surface of the partially reflective mirror and configured to measure an intensity of signal light reflected by the partially reflective mirror;

a second photodetector disposed on a side of the second surface of the partially reflective mirror and configured to measure an intensity of signal light reflected by the partially reflective mirror;

a memory configured to store instructions; and a processor configured to execute the instructions to determine a transmission direction of light propagating through respective cores in the two multi-core fiber from the signal intensities measured by the first and second photodetectors.

2. The transmission direction determination apparatus according to claim 1, wherein:

the first lens is configured to collimate light that is output from each of a plurality of cores in the one multi-core fiber of the two multi-core fibers opposing to each other, and that propagates to the other multi-core fiber;

the second lens is configured to focus the light that has propagated from the one lens, and focus the light output from each of the plurality of cores in the first multi-core fiber on a corresponding core in the other multi-core fiber;

the first and second surfaces of the partially reflective mirror are two reflective surfaces that are a front surface and a rear surface of the partially reflective mirror, each of the two reflective surfaces being configured to reflect a prescribed percentage of the collimated light output from the one multi-core fiber and the other multi-core fiber, the two reflective surfaces being configured to transmit the collimated light therethrough, except for the prescribed percentage of the light, in a direction heading the other multi-core fiber;

the first photodetector is configured to measure the intensity of the signal light reflected by one of the two partially reflective mirrors;

the second photodetector is configured to measure the intensity of the signal light reflected by the other photodetector of the two the partially reflective mirrors; and the processor is configured to execute the instruction to determine a transmission direction of the light propagating between the two multi-core fibers based on the signal intensities measured by the first and second photodetectors.

3. The transmission direction determination apparatus according to claim 2, wherein the partially reflective mirror is configured to transmit light in a wavelength region of signal light included in the light propagating from the one multi-core fiber to the other multi-core fiber therethrough, and reflect, at the reflective surfaces, the prescribed percentage of the light in the wavelength region of the signal light, the percentage being small in comparison with a percentage of the light transmitting through the partially reflective mirror.

4. The transmission direction determination apparatus according to claim 2, wherein the partially reflective mirror is a dichroic mirror that is configured to transmit, at the front and rear surfaces, light in a wavelength region of signal light included in the light propagating from the one multi-core fiber to the other multi-core fiber, and to reflect, at the reflective surfaces, the prescribed percentage of the light in the wavelength region of the signal light, the percentage being small in comparison with a percentage of the light transmitting through dichroic mirror, the dichroic mirror being configured to reflect, at the one surface, light in a wavelength region shorter than the wavelength region of the signal light.

5. The transmission direction determination apparatus according to claim 4, wherein:
the multi-core fiber is doped with a rare earth element in the cores, which are transmission paths for light;
the light in a wavelength region shorter than the wavelength region of the signal light is excitation light that raises electron energy levels in the cores doped with the rare earth element and puts the rare earth element in an excitation state; and
the second lens is configured to focus the excitation light on the other multi-core fiber.

6. The transmission direction determination apparatus according to claim 2, wherein the processor is configured to execute the instructions to determine whether or not a signal intensity of light measured by the photodetectors is greater than or equal to a prescribed threshold value, determine a transmission direction of light propagating between the two multi-core fibers in a case in which the signal intensity of the light is greater than or equal to the prescribed threshold value, and output a signal indicating an error in a case in which the signal intensity of the light is less than the prescribed threshold value.

7. The transmission direction determination apparatus according to claim 2, wherein the partially reflective mirror is fixed, between the two multi-core fibers, so as to reflect the prescribed percentage of light outside the transmission path of the signal light.

8. A transmission direction determination apparatus comprising:
a first lens configured to collimate light propagating from one optical fiber bundle including a plurality of optical fibers to another optical fiber bundle including a plurality of optical fibers;
a second lens configured to focus the light that has propagated from the first lens;
a partially reflective mirror configured to reflect part of the collimated light and including a first surface and a second surface;
a first photodetector disposed on a side of the first surface of the partially reflective mirror and configured to measure an intensity of signal light reflected by the partially reflective mirror;
a second photodetector disposed on a side of the second surface of the partially reflective mirror and configured to measure an intensity of signal light reflected by the partially reflective mirror;
a memory configured to store instructions; and
a processor configured to execute the instructions to determine a transmission direction of light propagating through respective cores in the two multi-core fiber from the signal intensities measured by the first and second photodetectors.

9. A transmission direction determination method comprising:
collimating, by a first lens, light propagating from one multi-core fiber of two multi-core fibers to the other multi-core fiber of the two multi-core fibers;
focusing, by a second lens, the light that has propagated from the first lens;
reflecting, by a partially reflective mirror, part of the collimated light;
measuring, by a first photodetector disposed on a side of a first surface of the partially reflective mirror, an intensity of signal light reflected by the partially reflective mirror;
measuring, by a second photodetector disposed on a side of a second surface of the partially reflective mirror, an intensity of signal light reflected by the partially reflective mirror; and
determining, by a processor, a transmission direction of light propagating through respective cores in the two multi-core fiber from the signal intensities measured by the first and second photodetectors.

* * * * *